(12) United States Patent
Reau et al.

(10) Patent No.: US 8,871,141 B2
(45) Date of Patent: Oct. 28, 2014

(54) PROCESS FOR PREPARING A SILICON CARBIDE PART WITHOUT THE NEED FOR ANY SINTERING ADDITIVES

(75) Inventors: Adrien Reau, Palaiseau (FR); François Tenegal, Paris (FR); Jean Galy, Arcachon (FR)

(73) Assignees: Commissariat a l'Energie Atomique et aux energies alternatives, Paris (FR); Centre National de la Recherche Scientifique, Paris (FR)

(*) Notice: Subject to any disclaimer, the term of this patent is extended or adjusted under 35 U.S.C. 154(b) by 685 days.

(21) Appl. No.: 13/054,381

(22) PCT Filed: Jul. 17, 2009

(86) PCT No.: PCT/EP2009/059257
§ 371 (c)(1),
(2), (4) Date: Apr. 14, 2011

(87) PCT Pub. No.: WO2010/007170
PCT Pub. Date: Jan. 21, 2010

(65) Prior Publication Data
US 2011/0180977 A1    Jul. 28, 2011

(30) Foreign Application Priority Data

Jul. 18, 2008 (FR) ..................... 08 54904

(51) Int. Cl.
*C04B 35/575* (2006.01)
*C04B 35/626* (2006.01)

(52) U.S. Cl.
CPC ....... *C04B 35/575* (2013.01); *C04B 2235/5445* (2013.01); *C04B 2235/3217* (2013.01); *C04B 2235/666* (2013.01); *C04B 2235/3821* (2013.01); *C04B 35/6267* (2013.01); *C04B 2235/6562* (2013.01); *C04B 2235/608* (2013.01); *C04B 2235/604* (2013.01); *C04B 2235/77* (2013.01); *C04B 2235/3225* (2013.01); *C04B 2235/3817* (2013.01)
USPC ...................................... 264/682

(58) Field of Classification Search
USPC ................................. 264/604, 682
See application file for complete search history.

(56) References Cited

U.S. PATENT DOCUMENTS

| | | | | |
|---|---|---|---|---|
| 7,029,613 | B2* | 4/2006 | Wan et al. | 264/123 |
| 7,077,991 | B2* | 7/2006 | Wan et al. | 264/405 |
| 7,687,421 | B2 | 3/2010 | Dez et al. | |
| 2009/0014921 | A1 | 1/2009 | Tenegal et al. | |
| 2009/0121197 | A1* | 5/2009 | Thaler et al. | 252/516 |
| 2010/0139840 | A1 | 6/2010 | Allemand et al. | |
| 2010/0227754 | A1* | 9/2010 | Bernard-Granger et al. | 501/103 |

FOREIGN PATENT DOCUMENTS

| | | |
|---|---|---|
| FR | 2 865 671 | 8/2005 |
| FR | 2 906 242 | 3/2008 |
| WO | WO 2007/065870 A1 | 6/2007 |

OTHER PUBLICATIONS

Mayne et al., "Chemical Evolution of Laser Formed Si/C/N/A/(+Y)/O Nanopowders with Synthesis Conditions", 9$^{th}$ Cimtec—World Ceramics Congress, pp. 211-218, XP009033143.
Cauchetier et al., "Si/C/N Nanocomposite Powders with Al (and Y) Additives Obtained by Laser Spray Pyrolysis of Organometallic Compounds", Journal of Materials Science, 34 (1999), pp. 5257-5264, XP-001194443.
Dez et al., "Laser Synthesis of Silicon Carbonitride Nanopowders; Structure and Thermal Stability", Journal of the European Ceramic Society, 22 (2002) pp. 2969-2979.
Ortiz et al., "Effect of Sintering Atmosphere on the Mechanical Properties of Liquid-Phase-sintered SiC", Journal of the European Ceramic Society, 24 (2004), pp. 3245-3249.
Guo et al., "Investigation of Compaction and Sintering Behavior of SiC Powder After Ultra-Fine Treatment", Journal of Zhejiang University Science, 2004, pp. 950-955.
Suzuki et al., "Effects of Sintering Atmosphere on Grain Morphology of Liquid-Phase-Sintered SiC with $Al_2O_3$ Additions", Journal of the European Ceramic Society, 25 (2005), pp. 1611-1618.
Suzuki et al., "Some Experimental Consideration on the Mechanism of Pressureless Sintering of Silicon Carbide", Proc. of International Symposium of Factors in Densification and Sintering of Oxide and Non-oxide Ceramics, 1978, pp. 345-365.
8TOBIERSKI et al., "Sintering of Silicon Carbide I. Effect of Carbon," Ceramics International, 29 (2003), pp. 287-292.
Sciti et al., "Effects of Additives on Densification, Microstructure and Properties of Liquid-Phase Sintered Silicon Carbide", Journal of Materials Science, 35 (2000), pp. 3849-3855.
Bor-Wen Lin, "Hot-Pressing of β-SiC Powder with Al-B—C Additives", Journal of the American Ceramic Society, 69, pp. C-67-C-68.
Young-Wook Kim, "Effect of Initial α-Phase Content on Microstructure and Mechanical Properties of Sintered Silicon Carbide", Journal of the American Ceramic Society, 81 (1998), pp. 3136-3140.
Young-Wook Kim, "Mechanism of Grain Growth in Liquid-Phase-Sintered β-SiC", 1999, Journal of Materials Research, vol. 14, No. 14, Nov. 1999, pp. 4291-4293.
Vassen et al., "Processing and Properties of Nanograin Silicon Carbide", Journal of the American Ceramics Society, 82, 1999, pp. 2585-2593.

(Continued)

*Primary Examiner* — Joseph S Del Sole
*Assistant Examiner* — Russell Kemmerle, III
(74) *Attorney, Agent, or Firm* — Miles & Stockbridge P.C.

(57) ABSTRACT

The invention relates to a process for preparation of a part comprising silicon carbide with an average nanometric grain size and a relative density of more than 97%, said process comprising:
  a preform formation step by cold compaction of a nanometric silicon carbide powder or the formation of agglomerates of such a powder by granulation of the powder;
  a spark plasma sintering step of said preform or said agglomerates, without the addition of sintering, at at least one predetermined temperature and pressure so as to obtain the required relative density and average grain size, namely a relative density of more than 97% and a nanometric average grain size.

4 Claims, No Drawings

(56) References Cited

OTHER PUBLICATIONS

Vaβen et al., "Processing and Properties of Nanophase Non-oxide Ceramics", Materials Science and Engineering A301 (2001) pp. 59-68.

Tamari et al., "Effect of Spark Plasma Sintering on Densification and Mechanical Properties of Silicon Carbide", Journal of the Ceramic Society of Japan, 103 (1995), pp. 740-742.

Zhang et al., "Effects of Si Content on the Microstructure and Tensile Strength of an In Situ Al/Mg$_2$Si Composite", Journal Materials Research, vol. 14, No. 1, Jan. 1999, pp. 68-74.

Zhou et al., "Very Rapid Densification of Nanometer Silicon Carbide Powder by Pulse Electric Current Sintering", Journal of the American Ceramic Society, 83 (2000), pp. 654-656.

Guillard et al., "Densification of SiC by SPS—effects of Time, Temperature and Pressure", Journal of the European Ceramic Society, 27 (2007) pp. 2725-2728.

Yamamoto et al., "Consolidation of Nanostructured β-SiC by Spark Plasma Sintering", Journal of the American Ceramic Society, 87, (2004), pp. 1436-1441.

Yamamoto et al., "Mechanical Properties of β-SiC Fabricated by Spark Plasma Sintering", Journal of Materials Engineering and performance, Aug. 2005, pp. 460-466.

\* cited by examiner

PROCESS FOR PREPARING A SILICON CARBIDE PART WITHOUT THE NEED FOR ANY SINTERING ADDITIVES

TECHNICAL FIELD

This invention relates to a process for the preparation of a part comprising high density silicon carbide and nanometric grain size, without the need to use sintering additives.

Such parts, since they are made of silicon carbide, are highly refractory in nature and can thus be used in fields requiring exposure to very high temperatures such as the nuclear field.

Parts made using the process according to the invention are suitable for application particularly in the design of nuclear fuel cladding, first wall or nuclear waste confinement matrix materials.

STATE OF PRIOR ART

Silicon carbide parts are conventionally made by sintering, namely by a heat treatment in which the grains of a silicon carbide powder are welded together by heating to an appropriate temperature.

Sintering may be done in the solid phase only, namely all grains of silicon carbide powder remain in the solid state during the heat treatment, material transfers occurring by diffusion in the solid phase at grain joints. Treatment temperatures for this type of sintering conventionally exceed 2000° C.

Sintering can also include a liquid phase, this liquid phase corresponding to an additive element with a eutectic below the melting temperature of silicon carbide. This liquid phase contributes to:

- enabling re-arrangement of SiC particles, by contributing to facilitating slip between grains, and thus fast densification of the material;
- dissolution of the finest SiC grains followed by their re-crystallisation on the larger grains;
- once SiC particles have come into contact with each other, acceleration of diffusion mechanisms and consequently sintering.

Temperatures applied are usually between 1800° C. and 2000° C.

Apart from the mechanistic aspect described above, there are different sintering techniques, the most frequently used being:

- pressureless sintering;
- hot pressing;
- hot isostatic pressing;
- spark plasma sintering.

For pressureless sintering, the process consists of placing silicon carbide powder in a crucible usually made of graphite and heating it in a furnace possibly at a controlled atmosphere (for example with argon or nitrogen), the sintering time usually being fairly long with cycle durations of between 4 and 12 hours and constant durations of temperature plateaux varying from 5 minutes to 5 hours.

With this process, the authors (Ortiz et al., Journal of the European Ceramic Society, Vol. 24, pages 3245-3249, 2004; Guo et al., Journal of Zhejiang University Science, Vol. 5, pages 950-955, 2004; Suzuki et al., Journal of the European Ceramic Society, Vol. 25, pages 1611-1618, 2005) have shown that if a high density silicon carbide part with a high density greater than 97% measured according to the Archimedes' method is to be obtained, large quantities of sintering additives such as $Al_2O_3$, $Y_2O_3$, AlN, $B_4C$ are necessary with quantities varying from 2 to 20% by mass, and as a result, the final part contains impure silicon carbide. Sintering temperatures vary between 1900° C. and 2200° C. and grain sizes after sintering vary from 1 to more than 200 μm.

Authors have tested pressureless sintering of SiC powders without the need to use sintering agents, for example Suzuki et al., Proc. Of international symposium of factors in densification and sintering of oxide and non-oxide ceramics, Japan, 1978, the materials obtained after sintering at 2100° C. having a relatively low density (of the order of 50%), and a large grain size (of the order of 5 μm).

It is thus found that use of the so-called pressureless sintering process can result in dense silicon carbide parts in some cases, but it cannot eliminate the need to use sintering additives to obtain high densities.

With hot pressing, the silicon carbide powder is placed in a mould, to which a uniaxial pressure is applied under an argon or nitrogen atmosphere, the sintering time usually being very long with durations of between 2 and 5 hours. If a high density part is to be obtained, sintering additives such as $Al_2O_3$, $Y_2O_3$, CaO and MgO have to be used with contents of up to 0.5 and 16% by mass (as disclosed by Ludoslaw et al., Ceramics International, Vol. 29, 2003, pages 287-292, Sciti et al., Journal of Materials Science, Vol. 35, pages 3849-3855, 2000). Sintering temperatures vary from 1600° C. to 2200° C. for plateau durations varying from 5 minutes to 2 hours and pressures varying between 20 and 60 MPa (as disclosed in Bor-Wen et al., Journal of American Ceramic Society, Vol. 69, 1986, pages 67-68, Kim et al. in Journal of American Ceramic Society, Vol 81, 1998, pages 3136-3140, 1998 and in Journal of Materials Research, Vol. 14, No. 11, 1999). The grain sizes obtained can vary from 0.1 μm starting from nanometric powders to more than 10 μm. However, this technique cannot eliminate the need to use sintering additives.

The hot isostatic pressing (HIP) process consists of applying a gas pressure and temperature simultaneously to a perform previously placed under a vacuum in a metal, glass or quartz cladding, the conventional capacities of the installations used being of the order of 200 MPa and 2000° C. Due to the high pressures involved, this process can usually give a good final density and a fine microstructure, but without eliminating the need to use sintering additives (such as carbon or boron based additives), with contents varying from 1 to 7% by mass. The temperatures used during sintering vary between 1600 and 2000° C. with pressures varying from 130 MPa to 350 MPa and plateau durations between 30 minutes and 3 hours.

Thus with this process, densification of silicon carbide starting from nanometric sized powders can give a part that maintains a nanometric grain size (as disclosed by Vassen et al. in Journal of the American Ceramic Society, Vol. 82, pages 2585-2593, 1999 and in Materials Science and Engineering, pages 59-68, 2001) after sintering, however, it is still impossible to eliminate the need for sintering additives.

Finally, with the so-called spark plasma sintering (SPS) technique, a sample of silicon carbide powder is placed between two graphite pistons inside a mould, also made of graphite. More precisely, the process consists of applying electric pulses of several thousand amperes to said placed sample, while simultaneously applying a uniaxial pressure of up to 200 MPa. These current pulses pass through the material and/or the mould to quickly increase the powder temperature by the Joule effect. This can give a temperature rise rate of more than 400° C. per minute and thus extremely short cycle times (of the order of 15 to 30 minutes), thus minimising grain growth. Sintering additives such as $Al_2O_3$, $Y_2O_3$, $Al_4C_3$ and $B_4C$ are also used with this process to obtain parts with a high relative density. Globally, the temperatures used vary between 1500 and 2000° C. while pressures conventionally vary from 30 MPa to 70 MPa and plateau durations are between 2 and 10 minutes (as disclosed by Tamari et al, Journal of the ceramic society of Japan, Vol. 103, pages 740-742, 1995, Zhang et al., Journal of Material Research, Vol. 14, 1999, pages 68-74, and in Zhou et al., Journal of American Ceramic Society, Vol. 83, pages 654-656, 2000, Guillard and al., Journal of the European Ceramic Society, Vol. 27, pages 2725-2728, 2007).

Tests without sintering additives have been carried out starting from commercial powders with an average particle size of 30 nm, and from silicon carbide powders obtained by reactive grinding.

It has been impossible to obtain densities of more than 78% by sintering commercial powders without adding sintering agents, despite the use of very high sintering temperatures (nearly 2000° C.), which was accompanied by large growth of powder crystallites.

Sintering of powders obtained by reactive grinding has given better densities (of the order of 98%, as disclosed by Yamamoto et al., Journal of American Ceramic Society, Vol. 87, pages 1436-1441, 2004, and in Journal of materials engineering and performance, Vol. 14, pages 460-466, 2005), but with a significant increase in the size of crystallites.

Furthermore, the use of reactive grinding to obtain SiC powders is relatively expensive. Reactive grinding conventionally starts with mixing micrometric sized carbon and silicon powders for a fairly long time (possibly of the order of 12 hours), and then grinding the mix obtained for a duration that can last several days (for example 48 hours) in a jar type device. Furthermore, the grinding technique is known to generate pollution of ground powders due to wear of the balls and the jar. The balls and the jar are usually made of zirconium or alumina. This pollution can then act like sintering additives and significantly reduce the purity of the final material. All operations to place powders in jars and to collect the ground powder must be done in a glove box. The size of the powders finally obtained typically varies from 50 to 150 nm.

Therefore, there is a genuine need for a process that can produce silicon carbide parts with a high relative density (preferably more than 97%) and a nanometric grain size (preferably smaller than 50 nm) without the use of sintering additives and preferably without the disadvantages inherent to the use of a powder obtained by reactive grinding as mentioned above.

DESCRIPTION OF THE INVENTION

The invention thus relates to a process for preparation of a part comprising silicon carbide with an average nanometric grain size and a relative density of more than 97%, said process comprising:
a preform formation step by cold compaction of a nanometric silicon carbide powder or a formation step of agglomerates of such a powder by granulation of the powder;
a spark plasma sintering step of said preform or said agglomerates, without sintering additive(s), at at least one predetermined temperature and pressure so as to obtain the required relative density and average grain size, namely a relative density of more than 97% and a nanometric average grain size.

This newly developed process has the advantages that it can be used to make:
very high purity parts made of silicon carbide, due to the lack of sintering additives;
parts with a relative density of more than 97%, without the need for sintering additives;
parts with a nanometric average grain size, without the need for sintering additives.

Note that a nanometric average grain size conventionally means an average grain size of less than 100 nm, this average grain size being measured using appropriate software to count and measure a large number of grains (typically more than 500) using scanning electron microscope (SEM) observation plates made in several locations on the sample.

Grain means each of the single crystals making up the silicon carbide part after the process has been completed, the average grain size being equal to the average diameter of these single crystals.

Note that sintering additives in the context of the invention mean additives in the form of a powder with a chemical nature different from the silicon carbide, these additives possibly for example being $Al_2O_3$, $Y_2O_3$, $Al_4C_3$ and $B_4C$, these additives conventionally being intended to facilitate sintering, particularly by facilitating the re-arrangement of grains and also by allowing a reduction in the sintering temperature.

The direct use of nanometric powders in a spark plasma sintering apparatus can have the following disadvantages, due to their low apparent densities:
during the application of pressure, some of the powder can rise between the mould and the piston and make the apparatus dirty, thus resulting in a low density part;
spark plasma sintering of powder can generate large shrinkage when pressure is applied and thus when densification of said powder takes place, and consequently very thin parts.

Thus, the process according to the invention comprises a step in which a preform is formed by cold compaction of said powder or agglomerates are formed by granulation of said powder, particularly so as to obtain micronic sized aggregates.

The preform formation step can typically consist of placing a nanometric silicon carbide powder in a press, so as to consolidate the powder in a predetermined shape, this shape being configured so that it can easily be inserted into a spark plasma sintering apparatus. The applied pressure is usually a few thousand bars.

According to one variant, this preform formation step can include:
a first cold compaction step to obtain a first preform;
a step to crushing said first preform; and
a second cold compaction step on the fragments obtained during the previous step, to obtain a second preform with a higher apparent density than the first preform, and said second preform will be used in the spark plasma sintering step.

The agglomerate formation step in order to form micronic sized aggregates (and thus increase the apparent density of said powder) may be done by spray drying or freeze drying.

The formation of agglomerates may also be obtained by creating a powder suspension in a liquid followed by a drying step in order to form granules.

One of the advantages of using a preform, or agglomerates is the ease and speed of use in the spark plasma sintering apparatus and safety during handling.

The silicon carbide powders used are nanometric powders (namely conventionally with an average particle size of less than 100 nm).

The silicon carbide powders are advantageously prepared by laser pyrolysis, which consists of making crossed jets interact using a $CO_2$ laser flow and a flow of gaseous reagents (for example acetylene and silane $SiH_4$). The use of this technique can give very high purity nanopowders and eliminates all disadvantages related to manufacturing of silicon carbide powders by reactive grinding as is done in prior art, like the very long grinding phases necessary to significantly reduce the size of crystallites which cause pollution of the powder.

The preform or agglomerates are then introduced into a spark plasma sintering apparatus, which is conventionally composed of:
- a mould, usually made of graphite, in which the powder, preform or agglomerates are placed;
- two pistons inserted into said mould and between which said powder, said preform or said agglomerates are located, so as to apply a uniaxial pressure.

The preform or agglomerates under pressure are simultaneously subjected to current pulses that pass through the material of these ones and/or the mould, causing a rapid increase in the temperature by the Joule effect.

Advantageously, the preform or agglomerates are subjected to at least one predetermined pressure consisting of a uniaxial pressure varying from 10 MPa to 250 MPa, from example equal to 130 MPa, and to at least a predetermined temperature consisting of at least one thermal cycle varying from 5 to more than 60 minutes for a temperature rise rate varying from 15° C./minute to more than 500° C./minute, so as to reach a maximum heating temperature varying from 1400° C. to 2000° C.

Such a thermal cycle can be used to obtain parts with an average grain size that remains within the nanometric range.

Furthermore, the relative density of the parts obtained is more than 97% of the theoretical density of the silicon carbide which is 3.21 g/cm$^3$. Therefore the mass density and therefore the relative density of the samples can be determined geometrically after machining the samples, using Archimedes' method or by making a measurement by helium pycnometry.

This process is applied for manufacturing of parts to be exposed to high temperatures, for example in the nuclear field.

We will now describe the invention with reference to the following examples given for illustrative and non-limitative purposes.

DETAILED PRESENTATION OF PARTICULAR EMBODIMENTS

Example

The silicon carbide powder used was synthesised using a laser pyrolysis technique. This process consists of making a $CO_2$ laser interact with a flow of gaseous reagents (for example acetylene $C_2H_2$ and silane $SiH_4$). The reagents absorb part of the energy originating from the laser beam and are broken down into a pyrolysis flame in which germination occurs followed by growth of the particles. Particle growth is stopped as particles exit the flame, due to the quenching effect. Powders obtained using this synthesis process are extremely pure. In this example, the average grain size of the powder used is 30 nm, determined after measuring a large number of particles (more than 500) starting from plates obtained with a Transmission Electron Microscope.

In this example, the powder was firstly formed in a preform. Therefore the powder is introduced into a cylindrical shaped latex duct. This cylindrical duct full of powder is put under a primary vacuum and then hermetically closed. It is then placed in a press in which an isostatic pressure of 4000 bars will be applied to it cold. The result is then a powder bar that can easily be machined and cut to obtain preforms with the required dimensions. In this example, the powder was made into 15 mm high and 20 mm diameter preforms so that they would fit perfectly into the chosen 20 mm diameter spark plasma sintering mould. Its relative density after this cold preparation step is about 46%.

The preform is then inserted into the mould that has been coated on the inside with a coat of Papyex (graphite paper). Papyex is also placed on the top and bottom faces of the preform to protect the pistons. The pistons are then introduced. The assembly is then placed in the spark plasma sintering apparatus.

In this example, the temperature of the sample was increased to 1700° C. at a rate of 100° C./minute, and then to 1850° C. at a rate of 50° C./minute. The sample was kept at this temperature for two minutes, and current pulses were then stopped enabling very fast cooling of the sample. During this cycle, the sample was subjected to a pressure of 50 MPa up to 800° C. and the pressure was then increased up to 130 MPa in four minutes. The maximum pressure was then kept constant until the end of the cycle.

The sample is then extracted from the mould and ground in the form of a cylinder so as to eliminate the graphite layer glued to its surface. This also assures that the sample has a satisfactory geometry and surface condition. The sample is then weighed and measured to determine its mass density and therefore its geometric density. In this example, the density of the sample determined geometrically is 3.13 g/cm$^3$ corresponding to a relative density of 97.5%. The density of the sample is then measured by helium pycnometry. This determines the real volume (apart from closed pores) of a massive sample with a known mass so that its density can be deduced. This density is 3.12 g/cm3 which gives a relative density of 97.2%. The density of the sample may also be determined using Archimedes' method. This consists of measuring the mass of the dry sample and then impregnating it with a liquid and measuring its mass when it is immersed in said liquid and then measuring its wet mass. With these three items of data, the density of the sample and the opened and closed pores ratio can be determined. The density obtained with this process is 3.13 g/cm3 which is equal to a relative density of 97.5% with 0.25% open pores and 2.25% closed pores.

The sample is then broken in the middle and observed at different magnifications at several locations using a Scanning Electron Microscope to check the homogeneity of the material. The high magnification plates obtained, typically ×100 000, are then analysed using special purpose software so as to measure all grains present on the plates. This operation is repeated on several plates from different parts of the sample. These data are used to determine the average grain size present in the material. The average grain size observed in this example is 46 nm.

The invention claimed is:

1. A process for preparation of a part comprising silicon carbide with an average grain size of less than 100 nm and a relative density of more than 97%, said process comprising:
   preparing a nanometric silicon carbide powder having a nanometric average grain size of less than 100 nm by laser pyrolysis;
   performing a preform formation step by cold compaction in a press of the nanometric silicon carbide powder; and
   performing a spark plasma sintering step of said preform, without sintering additives, at at least one predetermined temperature consisting of at least one thermal cycle lasting from 5 to 60 minutes for a temperature rise between 15° C./minute and 500° C./minute, so as to reach a maximum heating temperature between 1400° C. and 2000° C., so as to obtain a relative density of more than 97% and said nanometric average grain size, wherein said step of performing a preform formation step by cold compaction is performed by cold isostatic pressure.

2. The process according to claim 1, in which the spark plasma sintering step is performed at at least one predetermined pressure varying from 10 MPa to 250 MPa.

3. The process according to claim 1, wherein said cold pressure is about 4000 bars.

4. The process according to claim 1, wherein said step of performing a preform formation step further comprises:

performing a first cold compaction step to obtain a precursor preform;

crushing said precursor perform; and performing a second cold compaction step on fragments obtained from said crushing step to obtain said preform, said preform having a higher density than the precursor preform.

* * * * *